US012771579B2

(12) United States Patent
(10) Patent No.: US 12,771,579 B2

Tamaki et al.

(45) Date of Patent: Oct. 20, 2026

(54) COMMUNICATION APPARATUS AND COMMUNICATION SYSTEM

(71) Applicant: CANON KABUSHIKI KAISHA, Tokyo (JP)

(72) Inventors: Hiroto Tamaki, Saitama (JP); Masaru Tomabechi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/896,658

(22) Filed: Sep. 25, 2024

(65) Prior Publication Data

US 2025/0106071 A1 Mar. 27, 2025

(30) Foreign Application Priority Data

Sep. 27, 2023 (JP) ................................ 2023-164190

(51) Int. Cl.
*H04L 25/02* (2006.01)
*H04L 25/03* (2006.01)

(52) U.S. Cl.
CPC .... *H04L 25/0272* (2013.01); *H04L 25/03949* (2013.01)

(58) Field of Classification Search
CPC ...................... H04L 25/0272; H04L 25/03949
USPC .......................................................... 375/262
See application file for complete search history.

(56) References Cited

U.S. PATENT DOCUMENTS

2020/0052725 A1* 2/2020 Kuwahara ................ H04B 3/32
2022/0224159 A1* 7/2022 Matsumoto ............. H02J 50/05

FOREIGN PATENT DOCUMENTS

JP 6304906 B2 4/2018

* cited by examiner

*Primary Examiner* — Leila Malek

(74) *Attorney, Agent, or Firm* — Canon U.S.A., Inc. IP Division

(57) ABSTRACT

A communication apparatus includes a differential transmission path formed of a first electrode and a second electrode to perform wireless communication with another communication apparatus through an electromagnetic field coupling, and a communication unit configured to transmit a signal to the differential transmission path or receive a signal from the differential transmission path, wherein a first end of the differential transmission path is connected to the communication unit and a second end of the differential transmission path is terminated by a termination member, wherein the first electrode and the second electrode are each formed in a substantially arc shape about a predetermined axis, the substantially arc shapes of the first electrode and the second electrode being arranged as an outside and an inside, respectively, and wherein a filter portion is provided on the differential transmission path.

11 Claims, 7 Drawing Sheets

ΔT = 0UI

ΔT = 0UI

ΔT = 0.25UI

ΔT = 0.25UI

ΔT = 0.5UI

ΔT = 0.5UI

ΔT = 0.75UI

ΔT = 0.75UI

ΔT = 1UI

ΔT = 1UI

FIG.3A
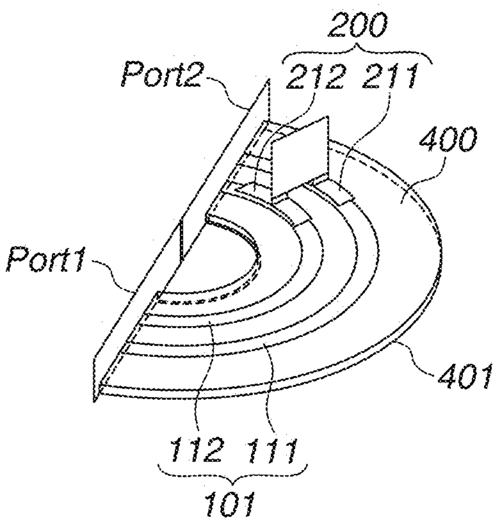
FIG.3B
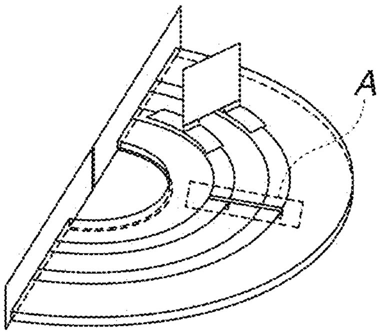
FIG.3C
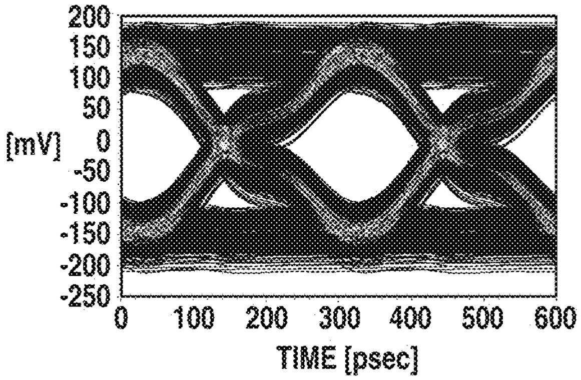
FIG.3D
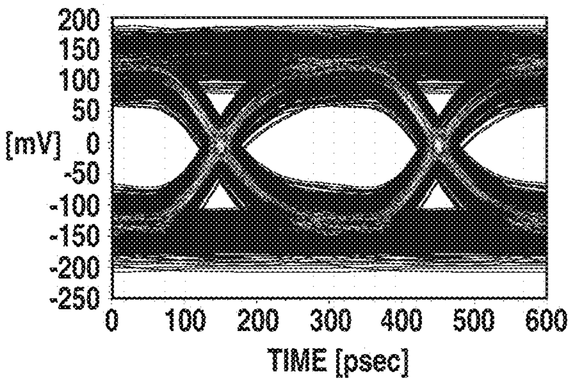
FIG.3E
| MEASUREMENT ITEM | COMMON MODE FILTER IS ABSENT | COMMON MODE FILTER IS PRESENT |
|---|---|---|
| Eye Width [psec] | 192.9 | 238.0 |
| Eye JitterP2P [psec] | 129.6 | 72.6 |
| Eye Rise Time [psec] | 155.3 | 112.0 |
| Eye Fall Time [psec] | 157.0 | 120.5 |

COMMUNICATION APPARATUS AND COMMUNICATION SYSTEM

BACKGROUND

Field of the Disclosure

The present disclosure relates to a wireless communication technique.

Description of the Related Art

There has been a known communication system for performing communication using a communication apparatus at a rotation portion, such as a pan head in a network camera or a joint of a robot hand or a robot arm. Wireless communications using the communication apparatus advantageously provides unlimited rotations of the rotation portion and improved maintenance performance without the risk of wire disconnection.

Japanese Patent No. 6304906 discusses a communication system that enables non-contact data transmission with an electromagnetic field coupling between a differential transmission path provided in a circular shape on a dielectric substrate of a (transmission-side) communication apparatus at a rotation portion and a coupler in an opposed (reception-side) communication apparatus. The communication apparatus disclosed in Japanese Patent No. 6304906 achieves height reduction with the circular differential transmission path provided on the dielectric substrate. However, the difference in wiring length between the two conductors constituting the differential transmission path can causes a difference in conveyance delay, limiting speed-up.

SUMMARY OF THE DISCLOSURE

The present disclosure is directed to providing a communication apparatus that is applied to a rotation portion and is capable of high-speed data transmission.

According to an aspect of the present disclosure, a communication apparatus includes a differential transmission path formed of a first electrode and a second electrode to perform wireless communication with another communication apparatus through an electromagnetic field coupling, and a communication unit configured to transmit a signal to the differential transmission path or receive a signal from the differential transmission path, wherein a first end of the differential transmission path is connected to the communication unit and a second end of the differential transmission path is terminated by a termination member, wherein the first electrode and the second electrode are each formed in a substantially arc shape about a predetermined axis, the substantially arc shapes of the first electrode and the second electrode being arranged as an outside and an inside, respectively, and wherein a filter portion is provided on the differential transmission path.

Further features of the present disclosure will become apparent from the following description of exemplary embodiments with reference to the attached drawings.

BRIEF DESCRIPTION OF THE DRAWINGS

FIG. 3A is a perspective view of a simulation model without the common mode filter. FIG. 3B is a perspective view of the simulation model with the common mode filter. FIG. 3C illustrates an eye diagram without the common mode filter. FIG. 3D illustrates an eye diagram with the common mode filter. FIG. 3E is a table illustrating the summary of measurement results of the eye diagrams illustrated in FIGS. 3C and 3D.

DESCRIPTION OF THE EMBODIMENTS

Exemplary embodiments of the present disclosure will be described in detail below with reference to the accompanying drawings.

The following exemplary embodiments are merely examples for implementing the present disclosure and can be appropriately modified or changed depending on the configurations and various conditions of apparatuses to which the present disclosure is applied. Thus, the present disclosure is in no way limited to the following exemplary embodiments.

[Configuration of Wireless Communication System]

Figure 1A:
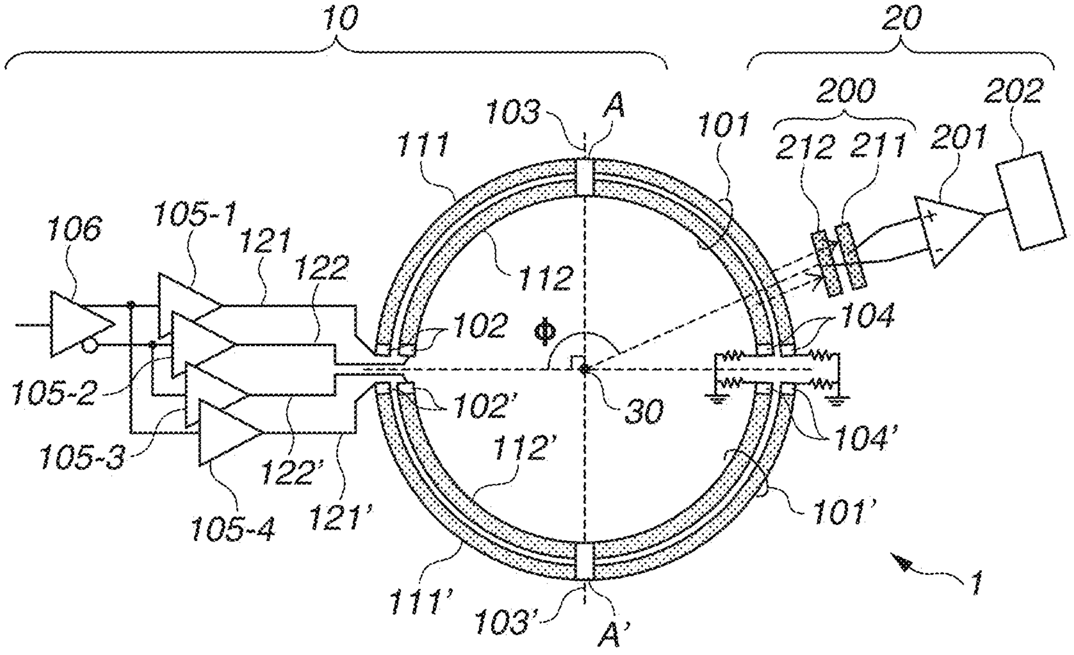
FIG. 1A illustrates a configuration example of a wireless communication system according to a first exemplary embodiment.

A first exemplary embodiment will be described. FIG. 1A illustrates a configuration example of a wireless communication system 1 according to the first exemplary embodiment. The wireless communication system 1 includes a transmission-side communication apparatus 10 and a reception-side communication apparatus 20.

The communication apparatus 10 includes differential transmission paths 101 and 101', amplifier circuits 105-1 to 105-4, and a transmission circuit 106. In the present exemplary embodiment, the differential transmission paths 101 and 101' are provided on a dielectric substrate (not illustrated) to achieve height reduction. The communication apparatus 20 includes a coupler 200, a shaping circuit 201, and a reception circuit 202. The wireless communication system 1 includes a rotation control unit (not illustrated) that controls at least one of the coupler 200 and the differential transmission paths 101 and 101' to rotate with the coupler 200 opposed to the differential transmission paths 101 and 101'. With this configuration, the coupler 200 and the differential transmission paths 101 and 101' relatively rotate about a rotation axis 30.

Configuration examples of the communication apparatus 10 and the communication apparatus 20 will now be described in detail with reference to FIG. 1A.

[Configuration of (Transmission-Side) Communication Apparatus 10]

A configuration example of the transmission-side communication apparatus 10 will be described. The communication apparatus 10 includes the differential transmission paths 101 and 101', the amplifier circuits 105-1 to 105-4, and the transmission circuit 106.

The transmission circuit 106 converts received signals into differential signals, and outputs the differential signals to the amplifier circuits 105-1 to 105-4, respectively. For example, the transmission circuit 106 receives a serial digital interface (SDI) signal transmitted as a single-ended signal with a characteristic impedance of 75Ω, converts the SDI signal into a differential signal, and outputs the differential signal to the amplifier circuits 105-1 to 105-4, respectively. In the example illustrated in FIG. 1A, the transmission circuit 106 outputs a positive differential signal as a differential digital signal to the amplifier circuits 105-1 and 105-4, and outputs a negative differential signal as a differential digital signal to the amplifier circuits 105-2 and 105-3.

A fan-out circuit (a circuit including a maximum number of outputs to be connected to a subsequent-stage circuit) is used as the transmission circuit 106 according to the present exemplary embodiment, the transmission circuit 106 is connected to the amplifier circuits 105-1 to 105-4. In some embodiments, an output signal from the transmission circuit 106 can be split by a splitter, and the split signals can be input to the amplifier circuits 105-1 to 105-4, respectively. Having the same configuration as each other, the amplifier circuits 105-1 to 105-4 can be collectively referred to as the amplifier circuit 105. While FIG. 1A illustrates that the transmission circuit 106 and the amplifier circuit 105 are schematically connected using single lines, a resistance divider or a Wilkinson splitter (splitter) for dividing a high-frequency signal can be provided. An element, such as a resistor, can also be provided.

The amplifier circuit 105 amplifies a signal received from the transmission circuit 106, and outputs the amplified signal to the differential transmission paths 101 and 101'. Specifically, the amplifier circuits 105-1 and 105-2 output the amplified signals to the differential transmission path 101 via lines 121 and 122, respectively. The amplifier circuits 105-3 and 105-4 output the amplified signals to the differential transmission path 101' via lines 122' and 121', respectively. In the present exemplary embodiment, the lines 121, 122, 122', and 121' have substantially the same electrical length as each other. If the level of output signals from the transmission circuit 106 is sufficiently high, the amplifier circuit 105 can be omitted.

The differential transmission path 101 is formed of conductors (also referred to as electrodes) 111 and 112 in an arc shape about the rotation axis 30. While FIG. 1A illustrates an example where the conductors 111 and 112 are each formed in an arc (circular) shape about the rotation axis 30, the conductors 111 and 112 can be each formed in a substantially arc shape about the rotation axis 30 (e.g., the distance from the rotation axis 30 is within a predetermined range). One end of the conductor 111 and one end of the conductor 112 are each provided with a power feeding portion 102. The power feeding portions 102 of the conductors 111 and 112 are connected to the amplifier circuits 105-1 and 105-2 via the lines 121 and 122, respectively. With this configuration, a positive differential signal or a negative differential signal amplified by the amplifier circuit 105 is input to the conductors 111 and 112. The other ends of the conductors 111 and 112 are each provided with a termination portion 104 and are each terminated with a terminating resistor (termination member) that is substantially equal to the characteristic impedance of the differential transmission path 101. Since the conductor 111 and the conductor 112 are each formed in a circular shape, there is a difference in wiring length therebetween. Referring to FIG. 1A, the conductor 111 and the conductor 112 are arranged outside and inside, respectively, as viewed in a reference direction parallel to the rotation axis 30. Thus, the wiring length of the conductor 111 is longer than that of the conductor 112.

The differential transmission path 101' has the same configuration as that of the differential transmission path 101. The components of the differential transmission path 101' denoted by corresponding reference numerals with prime marks "'" are the same as those of the differential transmission path 101 denoted by corresponding reference numerals with no prime marks, and thus the descriptions thereof are omitted.

It can be desirable to maintain the coupling between the differential transmission paths 101 and 101' and the coupler 200 (to be described below) that relatively rotate about the rotation axis 30 so that communication can be performed at all the rotation angles. Thus, the power feeding portions 102 and 102' and the termination portions 104 and 104' are arranged such that the power feeding portions 102 are adjacent to power feeding portions 102' and the termination portions 104 are adjacent to termination portions 104' as illustrated in FIG. 1A (i.e., within a predetermined distance). If the coupler 200 is moved from the termination portions 104 to the termination portions 104' (or in the reverse), the positive differential signal and the negative differential signal are output to the conductors 111, 112, 111' and 112' in such a manner that the signals to be transmitted to the coupler 200 are continuous in phase.

As described above, the conductor 112 is formed inside the conductor 111 as viewed in the reference direction parallel to the rotation axis 30. Thus, the difference in wiring length between the conductors 111 and 112 causes a difference in propagation delay. In other words, phase shifts (phase difference) occur between the positive and negative differential signals through the conductors 111 and 112, respectively. To reduce the effect of phase shifts on the communication, in the present exemplary embodiment, a common mode filter for attenuating a common mode noise current is provided on the differential transmission paths. Specifically, common mode filters A and A' are connected (mounted) in series on the differential transmission paths 101 and 101', respectively. It is generally known that a common mode filter provided on a differential transmission path makes it possible to cancel phase shifts between differential signals.

The common mode filter A can be provided at a desired position on the differential transmission path 101. In the example illustrated in FIG. 1A, the common mode filter A is provided on the central line 103 on the differential transmission path 101. Specifically, the common mode filter A is provided at a substantially central position between the ends of the differential transmission paths 101 and 101'. The term "substantially central position" used herein refers to a position where, for example, the angles formed between the power feeding portions 102 and the position of the common mode filter A, and between the termination portions 104 and the position of the common mode filter A about the rotation axis 30 are within predetermined ranges. Similarly, the common mode filter A' is provided on the central line 103' on the differential transmission path 101'. Each configuration of the common mode filters A and A' is not particularly limited, as long as the common mode filters A and A' are filter portions each having a function that corrects (including cancelling and absorbing) phase shifts between differential signals (difference in propagation delay between the conductors).

Figure 1B:
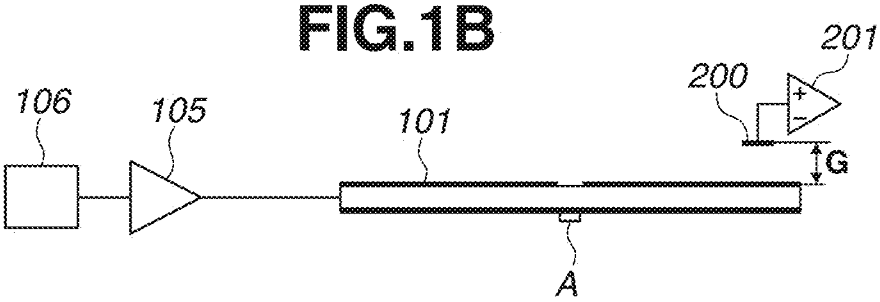
FIG. 1B illustrates a part of the configuration example of the wireless communication system with a common mode filter provided on the back of a dielectric substrate.

The common mode filter A can be provided on the surface of the dielectric substrate opposite from the differential transmission path 101. In the present exemplary embodiment, for the sake of description, the surface of the dielectric substrate on which the differential transmission path 101 is provided is referred to as the front, and a surface of the dielectric substrate that is opposed to the front is referred to as the back. FIG. 1B illustrates a part of the configuration example of the wireless communication system 1 with the common mode filter A provided on the back of the dielectric substrate. When the common mode filter A is provided on the front (i.e., the surface on which the differential transmission path 101 is provided), a wide gap needs to be left corresponding to the height of the common model filter A between the communication apparatuses 10 and 20. On the other hand, as illustrated in FIG. 1B, when the common mode filter A is provided on the back (i.e., the surface opposite to the surface on which the differential transmission path 101 is provided), the distance between the communication apparatuses 10 and 20 can be reduced without the need to consider the height of each component. With this configuration, a higher level (e.g., a voltage level) of the received signal in the communication apparatus 20 can be obtained as compared with a case where the common mode filter A is provided on the front of the dielectric substrate.

The common mode filter A' can also be provided on the differential transmission path 101' in the same manner as described above.

[Configuration of (Reception-side) Communication apparatus 20]

A configuration example of the reception-side communication apparatus 20 will now be described. The communication apparatus 20 includes the coupler 200, the shaping circuit 201, and the reception circuit 202.

The coupler 200 includes conductors 211 and 212, which are respectively coupled with the differential transmission paths 101 and 101' in the communication apparatus 10 via an electromagnetic field coupling. Specifically, the conductor 211 is at least partially opposed to the conductor 111 or the conductor 111', and the conductor 212 is at least partially opposed to the conductor 112 or the conductor 112' while the conductors 211 and 212 are respectively coupled with the differential transmission paths 101 and 101' with an electromagnetic field coupling.

The coupler 200 is configured to rotate relatively to the differential transmission path 101 about the rotation axis 30. This configuration enables the wireless communication system 1 to perform wireless communication from the communication apparatus 10 to the communication apparatus 20 with relative rotations about the rotation axis 30.

The shaping circuit 201 has a function of converting a radio signal excited via an electromagnetic field coupling in the coupler 200 into an analog signal that can be treated as an electric signal. In the present exemplary embodiment, the input impedance of the shaping circuit 201 is set to a high impedance of several tens of kQ. As a result, the input impedance increases even in a low-frequency band due to a capacitance component generated from an electromagnetic field coupling between the differential transmission paths 101 and 101' and the coupler 200, and signals in the low-frequency band are also transmitted to the shaping circuit 201. Thus, a reception waveform generated at the input end of the shaping circuit 201 can be transmitted with the rectangular shape of the waveform maintained. Further, the shaping circuit 201 has a function of amplifying the waveform of a received signal to a voltage level at which digital signals “0” and “1” can be identified by the reception circuit 202 provided at the subsequent stage.

The reception circuit 202 converts the voltage level of the signal received from the shaping circuit 201 into a voltage level to meet desired interface specifications for the subsequent-stage components (not illustrated). For example, the reception circuit 202 converts the voltage level of the signal received from the shaping circuit 201, and outputs the converted signal as an SDI signal. The reception circuit 202 can have, for example, a re-clock function of reproducing a clock by a clock data recovery (CDR).

[Advantageous Effect of Added Common Mode Filter]

An advantageous effect of common mode filters (common mode filters A and A' illustrated in FIG. 1A) will now be described. While in the present exemplary embodiment, an example will be described of the differential transmission path 101 including the conductors 111 and 112, a similar description is applicable to the differential transmission path 101' including the conductors 111' and 112'.

(1) Issue with Related Art when No Common Mode Filter is Added

An issue with the related art with no common mode filter added will now be described.

At the power feeding portions 102 of the communication apparatus 10 illustrated in FIG. 1A, positive and negative differential signal outputs from the transmission circuit 106 are in phase. However, a phase shift of $\Delta T$ occurs at the termination portions 104, where $\Delta T$ represents a difference in propagation delay caused by a difference in wiring length between the conductors 111 and 112. FIGS. 2A to 2J are graphs illustrating an issue with the related art, and an example of waveforms when the difference in propagation delay (phase shifts) $\Delta T$ is gradually shifted by a unit interval (UI) of 0.25 in the range from $\alpha$ UI to 1 UI. The term “UI” refers to a 1-bit period (a signal cycle). In FIGS. 2A to 2J, the horizontal axis represents times that are normalized by 1 UI, and the vertical axis represents voltage levels normalized by the voltages of positive and negative differential signals.

Figure 2A:
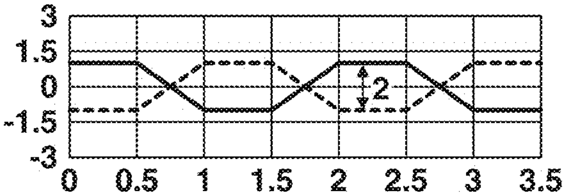
FIGS. 2A to 2J are graphs illustrating a problem of the related art.
Figure 2B:
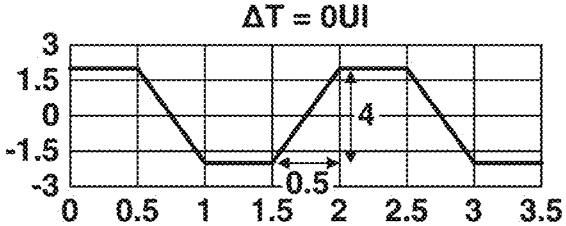
Figure 2C:
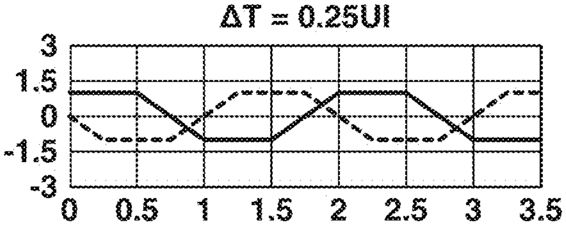
Figure 2D:
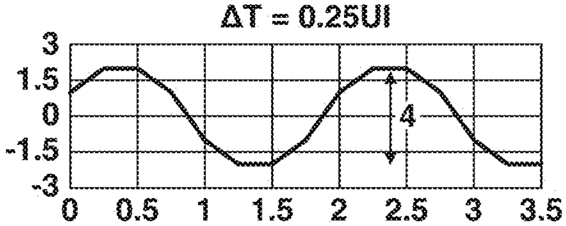
Figure 2E:
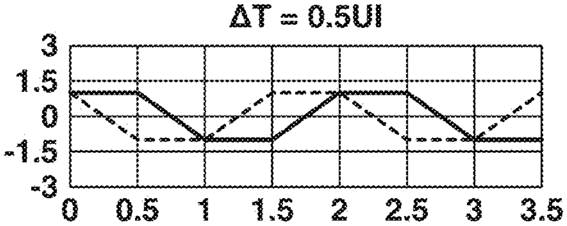
Figure 2F:
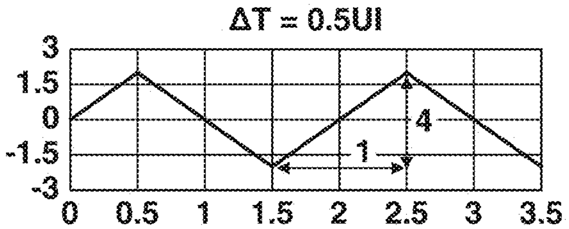
Figure 2G:
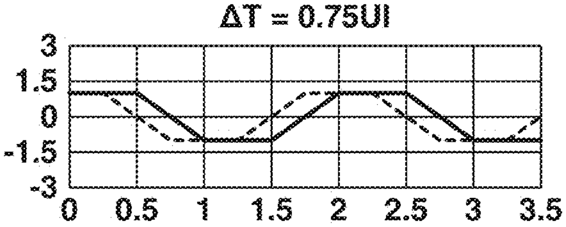
Figure 2H:
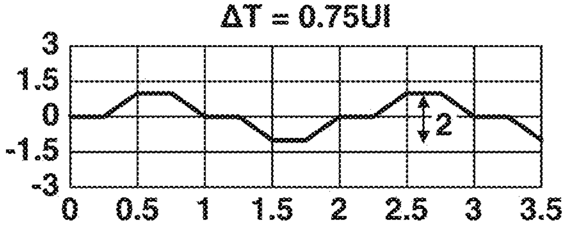
Figure 2I:
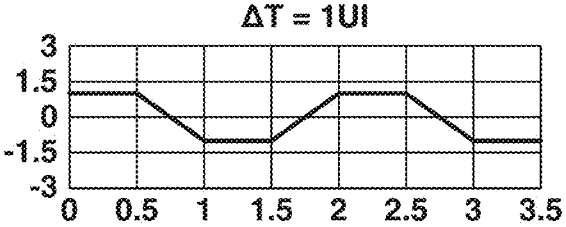

FIGS. 2A, 2C, 2E, 2G, and 2I (i.e., graphs on the left) each illustrate a waveform of the voltage level of a positive differential signal supplied to the conductor 111 on the differential transmission path 101 and a waveform of the voltage level of a negative differential signal supplied to the conductor 112 on the differential transmission path 101. In FIGS. 2A, 2C, 2E, 2G, and 2I, each solid line represents the voltage level of the positive differential signal supplied to the conductor 111, and each dashed line represents the voltage level of the negative differential signal supplied to the conductor 112. In FIG. 2I, the solid line and the dashed line agree with each other.

FIGS. 2B, 2D, 2F, 2H, and 2J (i.e., graphs on the right) each illustrate the voltage level of differential signals as output signals from the shaping circuit 201, in other words, a waveform of the difference voltage between the voltage levels of the positive differential signal and the negative differential signal illustrated in FIGS. 2A, 2C, 2E, 2G, and 2I. An output signal (differential signal) from the shaping circuit 201 herein is also referred to as a received signal for the sake of description.

As illustrated in FIG. 2B, when $\Delta T$=0 UI, i.e., when there is no phase difference between the conductors 111 and 112, the maximum voltage level (maximum amplitude) of the received signal is twice (=4) the voltage level (=2) of the positive differential signal and the negative differential signal illustrated in FIG. 2A. Assuming that the rise and fall times of the positive and negative differential signals illustrated in FIG. 2A are 0.5, the rise and fall times of the received signal are also 0.5 as illustrated in FIG. 2B.

On the other hand, as illustrated in FIG. 2F, when ΔT=0.5 UI, i.e., when there is a phase shift of 0.5 UI between the conductors 111 and 112, the slope of the rising and falling edges of the received signal is smaller than that when ΔT=0 UI as illustrated in FIG. 2B. Specifically, when ΔT=0.5 UI, the maximum amplitude of the received signal does not change from that (=4) when ΔT=0 UI as illustrated in FIG. 2B. However, the rise and fall times of the received signal indicate "1", which is twice the value (0.5) when ΔT=0 UI as illustrated in FIG. 2B, and the slope of the rising and falling edges of the received signal is one-half of the slope when ΔT=0 UI.

FIG. 2B illustrates an example where the temporal positions of the zero-crossing points at the voltage level of the received signal are 0.75+N (N is an integer), which is the same as those of the zero-crossing points of the reception levels of the positive and negative differential signals illustrated in FIG. 2A. In contrast, FIG. 2F illustrates that the temporal positions of the zero-crossing points of the voltage levels of the received signal are shifted to 1+N (N is an integer) by 0.25 UI.

In view of the above, it is obvious that when ΔT=0.5 UI, the waveform of the voltage level of the received signal degrades in the direction of the time axis as compared with the case where ΔT=0 UI.

Figure 2J:
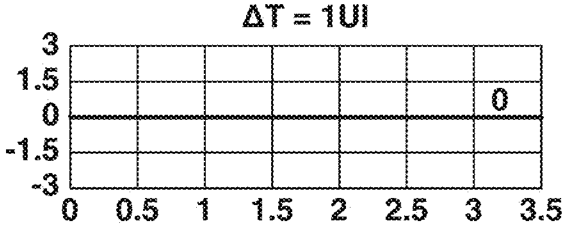

When the difference in propagation delay ΔT further increases from ΔT=0.5 UI illustrated in FIG. 2F through ΔT=0.75 UI to ΔT=1 UI, the voltage level of the received signal further decreases as illustrated in FIGS. 2H and 2J. When ΔT=1 UI, i.e., when the difference in propagation delay between the conductors 111 and 112 is shifted by one bit of the digital signal, the voltage level of the received signal is zero (0) as illustrated in FIG. 2J, which makes it difficult to detect the received signal.

As described above, the amount of propagation delay ΔT between the conductors 111 and 112 increases approaching the termination portions 104 on the differential transmission path 101. Accordingly, as illustrated in FIGS. 2B, 2D, 2F, 2H, and 2J, the waveform of the voltage level of the received signal is gradually collapsed. Such an issue becomes more noticeable as the speed of signals in communication increases, and it is easily presumed that higher-speed communication could be inhibited. In other words, a higher-speed signal being transmitted from the communication apparatus 10 cannot be accurately received by the communication apparatus 20 without a common mode filter. As a result, higher-speed communication (data transmission) is unachievable.

(2) Advantageous Effect of Added Common Mode Filter

An advantageous effect of the added common mode filter A according to the present exemplary embodiment will be described. A similar description to that of the common model filter A is applicable to the common mode filter A'.

As illustrated in FIG. 1A, in the present exemplary embodiment, the common mode filter A is provided at a substantially middle position on the differential transmission path 101. In other words, the common mode filter A is provided such that the lengths of the conductors 111 and 112 from the power feeding portions 102 to the common mode filter A are substantially equal to those from the common mode filter A to the termination portions 104. As understood with reference to FIGS. 2H and 2J, a phase shift greater than 0.5 UI can degrade the maximum amplitude of the voltage level of the received signal. For this reason, according to one exemplary embodiment, the common mode filter A can be desirably provided at a position where the phase shift (difference in propagation delay) is less than or equal to 0.5 UI.

Figure 1C:
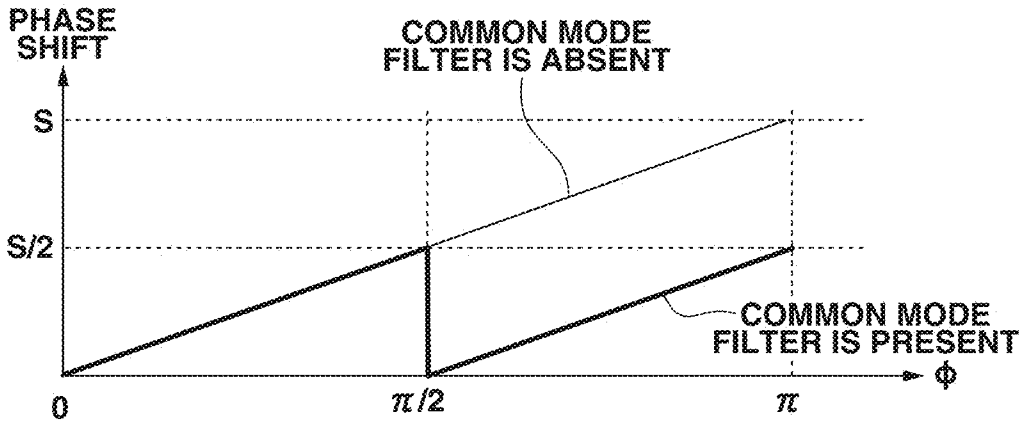
FIG. 1C illustrates characteristics of phase shifts with and without the common mode filter.

An angle formed between a predetermined position between the power feeding portions 102 and 102' and a substantial center of the coupler 200 in the communication apparatus 20 about the rotation axis 30, as viewed in the reference direction parallel to the rotation axis 30, is represented by Φ. The angle Φ can be defined as a position of the communication apparatus 20 relative to the communication apparatus 10. FIG. 1C illustrates characteristics of phase shifts between the positive and negative differential signals (difference in propagation delay between the conductors 111 and 112) with respect to the angle Φ (the position of the communication apparatus 20 relative to the communication apparatus 10) with and without the common mode filter A. In FIG. 1C, the horizontal axis represents the angle Φ, and the vertical axis represents phase shifts. A phase shift S on the vertical axis represents the maximum phase shift without the common mode filter A. In FIG. 1C, a thin solid line represents the characteristic without the common mode filter A, and a thick solid line represents the characteristic with the common mode filter A.

As understood with reference to FIG. 1C, without the common mode filter A, the phase shift is larger as the angle Φ increases, or, the coupler 200 (the reception device 20) approaches the termination portions 104. In contrast, with the common mode filter A, the phase shift is offset (cancelled) by the common mode filter A at the time when the angle Φ exceeds π/2 (=) 90°. Further, the characteristic varies such that the phase shift occurs again as the angle Φ increases.

As understood with respect to FIG. 1C, with the common mode filter A added, the maximum value of the phase shifts is one-half (S/2) of that without the common mode filter A. With the common mode filter A added, the maximum phase shift can be reduced to about half the maximum phase shift without the common mode filter A. This allows higher-speed communication. Referring to FIGS. 2A to 2J, as described above, without the common mode filter, the waveform of the voltage level of the received signal in the communication apparatus 20 degrades as the difference in propagation delay ΔT increases (or, as the phase shift between differential signals on the differential transmission path 101 increases). In contrast, with the common mode filter added, an increase in degradation of the waveform of the voltage level of the received signal can be avoided, which allows higher-speed communication.

[Verification of Advantageous Effect by Simulation]

The result of verifying the advantageous effect of the added common mode filter by an electromagnetic field simulation will be described. The simulation was performed using simulation models of the wireless communication system 1 having configurations as illustrated in FIGS. 3A and 3B. FIG. 3A is a perspective view of a simulation model without the common mode filter A. FIG. 3B is a perspective view of a simulation model with the common mode filter A. In FIGS. 3A and 3B, like reference numerals refer to like components identical to those of the wireless communication system 1 illustrated in FIG. 1A. In this electromagnetic field simulation, the S-parameter of Common Mode Noise Filter "DLM0QSB350HY2D" manufactured by Murata Manufacturing Co., Ltd. was used. This simulation was performed using the models with a semi-arc shape as illustrated in FIGS. 3A and 3B to reduce the calculation cost. A similar description to that of the simulation using the semi-arc models is also applicable to a simulation using a model having the configuration (i.e., circular shape) illustrated in FIG. 1A.

The differential transmission path 101 is formed in a copper pattern on a dielectric substrate 400, and the coupler 200 is provided at a position that is away from the differential transmission path 101 in a rotational axis direction by a transmission distance dZ. The differential transmission path 101 is a microstrip line, and a conductor 401 is a ground (GND) conductor with a reference potential. The dielectric substrate 400 has a hollow structure through which a mechanical rotation shaft, a shaft-shaped slip ring used in power transmission/low-speed communication can be inserted. A port 1 is a transmission port and a port 2 is a termination port. The reception-side communication apparatus 20 including the coupler 200 is provided at a position that is away from the port 1 in the rotational axis direction by 150 degrees (i.e., the angle Φ indicating the position of the communication apparatus 20 relative to the communication apparatus 10 is 150 degrees).

Table 1 illustrates parameters set in the simulation.

TABLE 1

| Parameters | Values [unit] |
|---|---|
| Inner diameter of central line of conductors 111 and 111' | 32 [mm] |
| Inner diameter of central line of conductors 112 and 112' | 23 [mm] |
| Wiring width | 3.4 [mm] |
| Transmission distance dZ | 1.0 [mm] |
| Thickness of dielectric substrate 400 | 1.6 [mm] |
| Differential impedance of coupler 200 | 20 [kΩ] |

FIGS. 3C and 3D illustrate the measurement results of eye diagrams for received signals in the simulation. FIG. 3C illustrates an eye diagram without the common mode filter A. FIG. 3D illustrates an eye diagram with the common mode filter A. A transmission rate of 3 Gbps is set on the assumption that 3G-SDI signals are used. FIG. 3E is a table illustrating the summary of measurement results of the eye diagrams illustrated in FIGS. 3C and 3D. As illustrated in FIG. 3E, the rise time (Eye Rise Time) and the fall time (Eye Fall Time) are improved with the common mode filter A added. It is also obvious that the jitter (Eye Jitter P2P) is improved by about 44% (129.6-72.6≈129.6×0.44). This result shows that the added common mode filter A improves the eye diagram for the received signal.

In this simulation, the phase shift caused by the difference in wiring length between the conductors 111 and 112 at an angle Φ of 150 degrees is about 0.3 UI, and the phase shift at an angle Φ of 90 degrees is about 0.18 UI. This simulation has proven that a phase shift of about 0.18 UI can be fully cancelled with the common mode filter added. As described above, the common mode filter A can be desirably provided at a position where the phase shift is less than or equal to 0.5 UI.

Modified Example of First Exemplary Embodiment

Figure 4A:
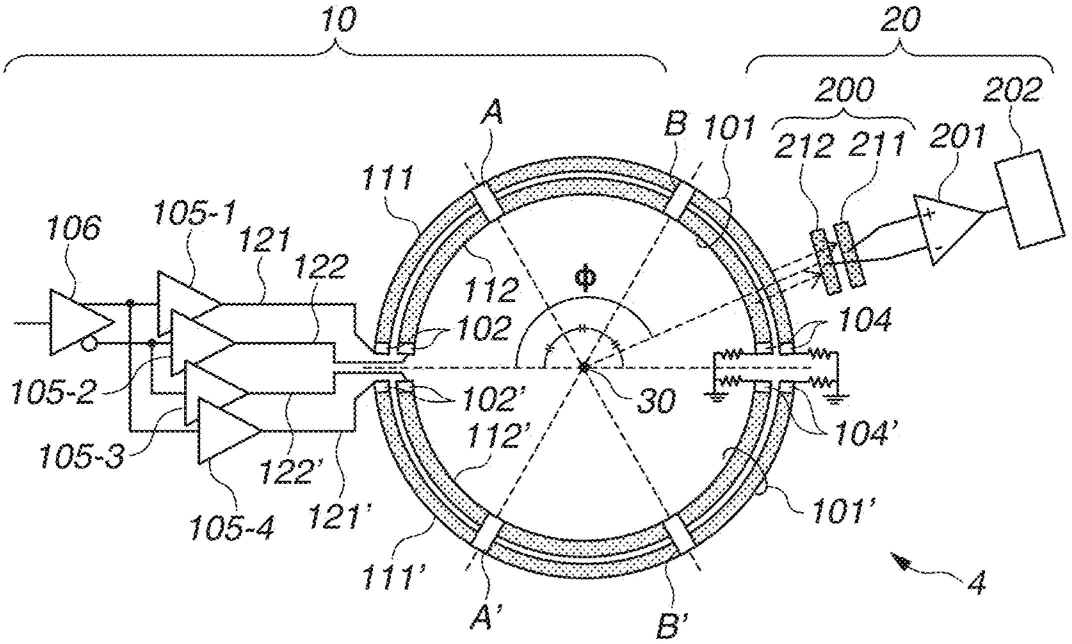
FIG. 4A illustrates a configuration example of the wireless communication system according to a modified example of the first exemplary embodiment.

FIG. 4A illustrates a configuration example of a wireless communication system 4 according to a modified example of the first exemplary embodiment. In the wireless communication system 4, two common mode filters (common mode filter A and common mode filter B) are provided on the differential transmission path 101 of the communication apparatus 10. In the configuration illustrated in FIG. 4A, the common mode filter A and the common mode filter B are provided at regular intervals on the differential transmission path 101. In other words, the common mode filter A and the common mode filter B are provided such that the distance from the power feeding portions 102 of the differential transmission path 101 to the common mode filter A, the distance from the common mode filter A to the common mode filter B, and the distance from the common mode filter B to the termination portions 104 of the differential transmission path 101 are substantially equal. Also, on the differential transmission path 101', a common mode filter A' and a common mode filter B' are provided in the same manner as the common mode filter A and the common mode filter B that are provided on the differential transmission path 101. This modified example illustrates an example where two common mode filters are provided as an example of providing a plurality of common mode filters on the differential transmission paths 101 and 101', but instead three or more common mode filters can be provided. In any case, a plurality of common mode filters can be provided substantially at regular intervals between the far ends of the differential transmission paths 101 and 101'. The term "substantially at regular intervals" indicates that, for example, an angle formed between one end of the differential transmission path 101 and one end of the differential transmission path 101' and the positions of the common mode filters near the ends about the rotation axis 30, and an angle formed between the positions of the adjacent common mode filters are within a predetermined range.

Figure 4B:
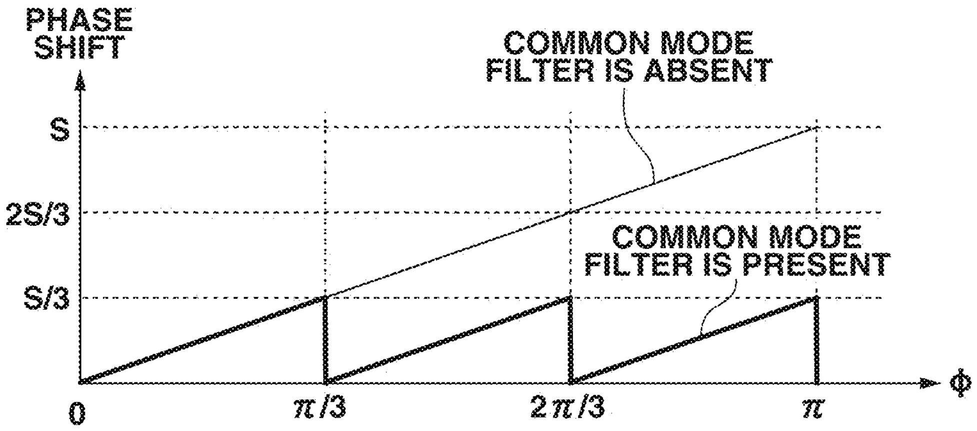
FIG. 4B illustrates the characteristics of phase shifts with and without the common mode filter.

FIG. 4B illustrates characteristics of phase shifts between positive and negative differential signals (a difference in propagation delay between the conductors 111 and 112) with respect to the angle Φ (the position of the communication apparatus 20 relative to the communication apparatus 10) with and without the common mode filters A and B. Similarly in FIG. 1C, the horizontal axis represents the angle Φ, and the vertical axis represents phase shifts. The phase shift S on the vertical axis represents the maximum phase shift without the common mode filters A and B. In FIG. 4B, a thin solid line represents a characteristic without the common mode filters A and B, and a thick solid line represents a characteristic with the common mode filters A and B.

The characteristic without the common mode filters A and B is similar to that illustrated in FIG. 1C. Specifically, the phase shift is larger as the angle Φ increases, or, the coupler 200 (reception device 20) approaches the termination portions 104.

In contrast, with the common mode filters A and B, the phase shift is cancelled at points where the angle Φ is $\pi/3$ (=) 60° and $2\pi/3$ (=) 120°. Thus, the maximum phase shift with the common mode filters A and B added can be reduced to one-third of the maximum phase shift S in principle. In other words, two common mode filters provided at regular intervals make it possible to reduce the phase shifts to 1/(2+1) in principle. In general, the phase shifts can be reduced to 1/(N+1) in principle with N common mode filters additionally provided at regular intervals. This configuration allows, even when a higher-speed signal is transmitted from the communication apparatus 10 as compared with the above-described exemplary embodiment, the reception device 20 to receive the signal, which leads to the further speed-up of communication. Consequently, for higher-speed communication, the increased number of common mode filters is effective.

Thus, in the present exemplary embodiment and the modified example, one or more common mode filters are provided on the differential transmission paths 101 and 101' of the communication apparatus 10 to cancel a phase shift between signals caused by a difference in wiring length between the two conductors (electrodes) that form the differential transmission paths 101 and 101'. This configuration enables higher-speed wireless data transmission between the communication apparatuses 10 and 20 with the communication apparatus 10 and/or the communication apparatus 20 applied to a rotation portion. Further, the communication apparatus 10 can be smaller in height by providing the differential transmission paths 101 and 101' on the dielectric substrate of the communication apparatus 10. The one or more common mode filters can be mounted on the front (the surface on which the differential transmission paths 101 and 101' are provided) or the back (see FIG. 1C) of the dielectric substrate. The distance between the communication apparatuses 10 and 20 can be reduced by mounting the one or more common mode filters on the back of the dielectric substrate, allowing more effective data transmission.

While the present exemplary embodiment described above illustrates an example where the input impedance of the shaping circuit 201 of the reception-side communication apparatus 20 is set to a high impedance of several tens of kΩ, the input impedance is not limited to this example. The input impedance of the shaping circuit 201 can be set to a lower impedance of, for example, 100Ω. In this case, the transmission characteristic from the differential transmission paths 101 and 101' to the coupler 200 is a characteristic similar to that of a high-pass filter (HPF) that indicates a low degree of coupling in a low frequency band and a high degree of coupling in a high frequency band. Thus, only the high-frequency component of a signal is transmitted from the differential transmission paths 101 and 101' to the coupler 200. Specifically, inexact differential waveforms (edge signals generated as rising edges or falling edges of digital signals input to the differential transmission paths 101 and 101') of signals input to the differential transmission paths 101 and 101' are generated in the coupler 200. For this reason, the shaping circuit 201 can be a circuit for restoring the differential waveforms to binary digital signals with the two values "1" and "0", such as a hysteresis comparator, instead of a simple amplifier circuit.

Figure 5:
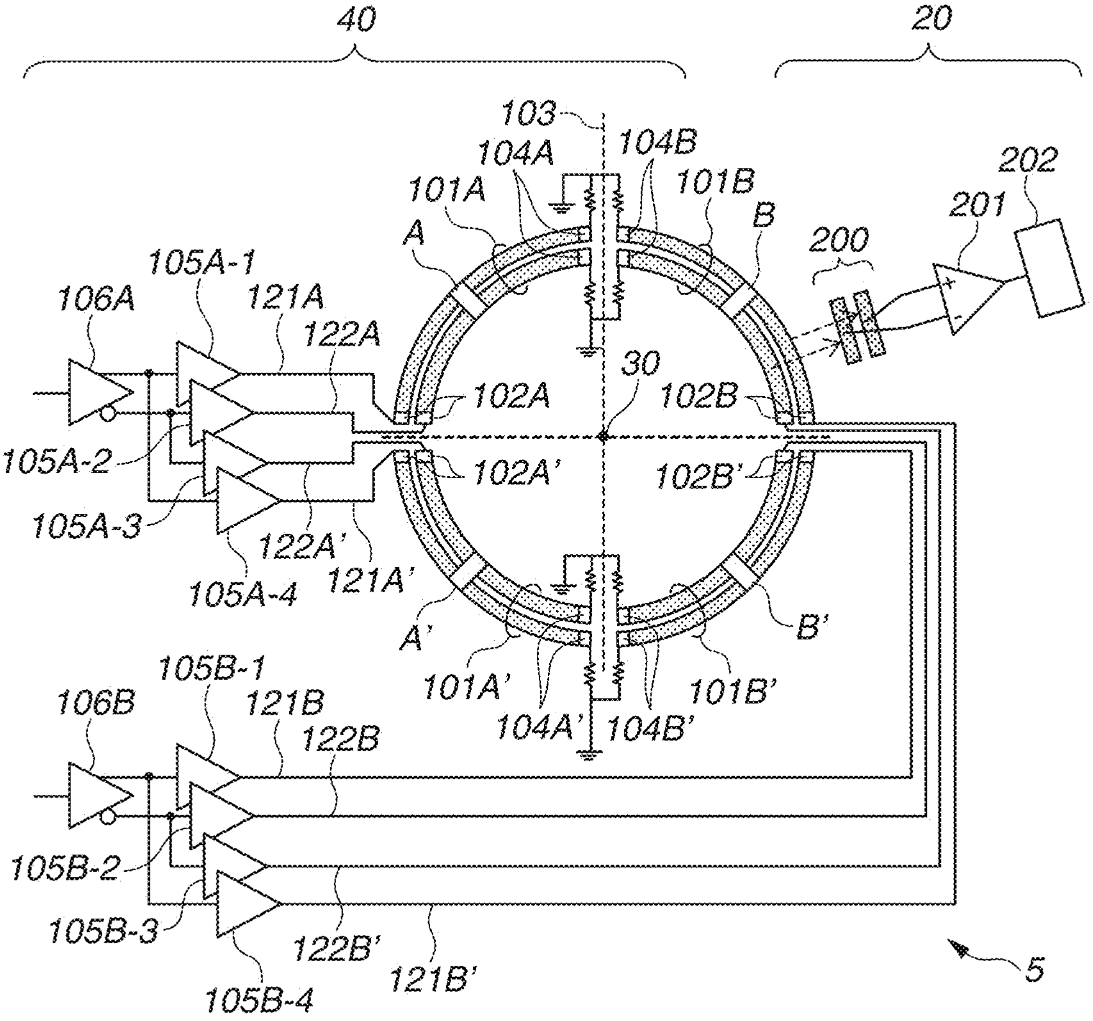
FIG. 5 illustrates a configuration example of a wireless communication system according to a second exemplary embodiment.

A second exemplary embodiment will now be described. FIG. 5 illustrates a configuration example of a wireless communication system 5 according to the second exemplary embodiment. The wireless communication system 5 differs from the wireless communication system 1 described in the first exemplary embodiment with reference to FIG. 1A in that a communication apparatus 40 is used in place of the transmission-side communication apparatus 10. Like reference numerals refer to like components identical to those of the wireless communication system 1 according to the first exemplary embodiment, and the descriptions thereof are omitted. The components denoted by reference numerals with "A" or "B" are similar to the corresponding components that are not denoted by the reference numerals with "A" or "B" in the communication apparatus 10 illustrated in FIG. 1A.

As described above in the first exemplary embodiment, for example, on the differential transmission path 101 of the communication apparatus 10 illustrated in FIG. 1A, a phase shift occurs that is caused by the difference in wiring length between the two conductors 111 and 112 consisting of the differential transmission path 101. The phase shift is larger with a longer wiring length. Thus, the communication apparatus 40 according to the present exemplary embodiment includes shorter differential transmission paths 101A, 101B, 101A', and 101B' in place of the differential transmission paths 101 and 101' of the communication apparatus 10.

Specifically, in the first exemplary embodiment, the differential transmission paths 101 and 101' are formed with a length of about 180 degrees as viewed in the reference direction parallel to the rotation axis 30, while in the present exemplary embodiment, the differential transmission paths 101A, 101B, 101A', and 101B' are formed with a length of about 90 degrees as viewed in the reference direction parallel to the rotation axis 30. While the communication apparatus 10 illustrated in FIG. 1A includes the two differential transmission paths 101 and 101', the communication apparatus 40 according to the present exemplary embodiment includes the four differential transmission paths 101A, 101B, 101A', and 101B'. For this reason, the communication apparatus 40 has a configuration in which a transmission circuit 106B, an amplifier circuit 105B, and differential transmission paths 101B and 101B' are provided symmetrically with respect to the central line 103. These components are identical to the corresponding components 106A, 105A, and 101A and 101A'. A transmission circuit 106A and the transmission circuit 106B are configured to transmit the same signal.

Thus, in the present exemplary embodiment, the difference in wiring length is reduced between the two conductors (electrodes) that form the differential transmission paths 101A, 101B, 101A', and 101B' in the communication apparatus 10. This makes it possible to reduce phase shifts caused by a difference in wiring length. Similarly in the first exemplary embodiment, common mode filters are provided on the differential transmission paths 101A, 101B, 101A', and 101B'. This configuration provides similar advantageous effects to those described in the first exemplary embodiment.

The transmission circuit 106A and the transmission circuit 106B can also be configured to transmit different signals (data) instead of transmitting the same signals. In this case, multiple channels that results from an increased number of reception-side communication apparatuses enable higher-speed data transmission.

Figure 6:
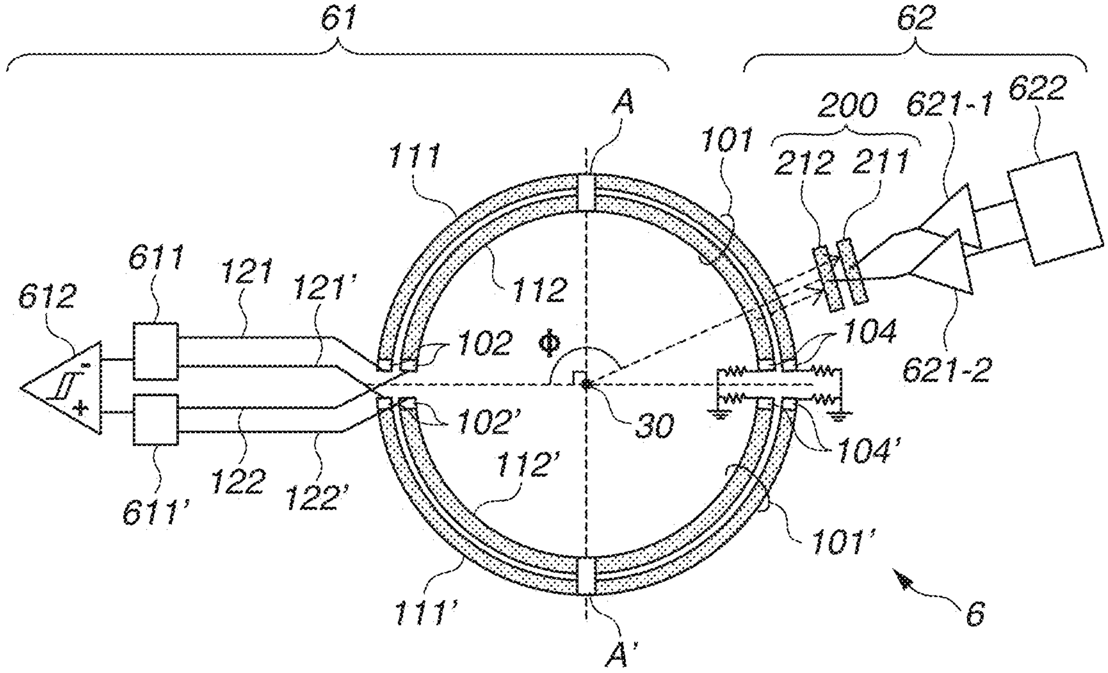
FIG. 6 illustrates a configuration example of a wireless communication system according to a third exemplary embodiment.

A third exemplary embodiment will now be described. FIG. 6 illustrates a configuration example of a wireless communication system 6 according to the third exemplary embodiment. The wireless communication system 6 includes a reception-side communication apparatus 61 and a transmission-side communication apparatus 62. Like reference numerals refer to like components identical to those of the wireless communication system 1 described in the first exemplary embodiment with reference to FIG. 1A, and the descriptions thereof are omitted. The wireless communication system 6 is configured to transmit signals from the coupler 200 to the differential transmission paths 101 and 101'. This transmission and reception relationship is opposite to that in the wireless communication system 1 according to the first exemplary embodiment.

The communication apparatus 61 includes the differential transmission paths 101 and 101', multiplexers 611 and 611', a shaping circuit 612, and a reception circuit (not illustrated). The communication apparatus 62 includes the coupler 200, amplifier circuits 621-1 and 621-2, and a transmission circuit 622. In the present exemplary embodiment, the differential transmission paths 101 and 101' are provided on the dielectric substrate to achieve height reduction, as in the communication apparatus 10 according to the first exemplary embodiment.

Similarly in the wireless communication system 1 according to the first exemplary embodiment, the wireless communication system 6 includes a rotation control unit (not illustrated) that controls the coupler 200 and the differential transmission paths 101 and 101' to relatively rotate about the rotation axis 30 with the coupler 200 opposed to the differential transmission paths 101 and 101'.

Configuration examples of the communication apparatus 62 and the communication apparatus 61 will be described in detail with reference to FIG. 6.

[Configuration of (Transmission-side) Communication apparatus 62]

A configuration example of the communication apparatus 62 will now be described. The communication apparatus 62 includes the coupler 200, the amplifier circuits 621-1 and 621-2, and the transmission circuit 622.

The transmission circuit 622 receives, for example, SDI signals, converts the received SDI signals into differential signals, and outputs the differential signals to the amplifier circuits 621-1 and 621-2, respectively. Specifically, the transmission circuit 622 outputs a positive differential signal as a differential digital signal to the amplifier circuit 621-1, and outputs a negative differential signal as a differential digital signal to the amplifier circuit 621-2. The amplifier circuits 621-1 and 621-2 amplify the signals received from the transmission circuit 622 with a desired amplification degree and output the amplified signals to the coupler 200. The coupler 200 includes the conductors 211 and 212. The positive differential signal is input to the conductor 211 and the negative differential signal is input to the conductor 212. The conductor 211 is at least partially opposed to the conductor 111 or the conductor 111' in the communication apparatus 61 and the conductor 212 is at least partially opposed to the conductor 112 or the conductor 112' in the communication apparatus 61 while the conductor 211 and the conductor 212 are respectively coupled with the conductor 111 or the conductor 111' and the conductor 112 or the conductor 112' with an electromagnetic field coupling. While FIG. 6 illustrates that the transmission circuit 622, the amplifier circuits 621-1 and 621-2, and the coupler 200 are schematically connected with single lines, a resistance divider or other devices for dividing a high-frequency signal can also be provided.

[Configuration of (Reception-side) Communication apparatus 61]

A configuration example of the communication apparatus 61 will now be described. The communication apparatus 61 includes the differential transmission paths 101 and 101', the multiplexers 611 and 611', the shaping circuit 612, and the reception circuit (not illustrated).

On the differential transmission paths 101 and 101', electric signals are excited by the electromagnetic field generated in the coupler 200. Specifically, the conductor 211 and the conductor 212 of the coupler 200 induce positive differential signals in the conductor 111 and the conductor 111' and induce negative differential signals in the conductor 112 and the conductor 112'. The positive differential signals are input from the conductor 111 of the differential transmission path 101 and the conductor 111' of the differential transmission path 101' via the paths 121 and 121' to the multiplexer 611. The negative differential signals are input from the conductor 112 of the differential transmission path 101 and the conductor 112' of the differential transmission path 101' via the paths 122 and 122' to the multiplexer 611'. The induction of the positive differential signal(s) or the negative differential signal(s) on the differential transmission path 101 and/or the differential transmission path 101' depends on the degree of the electromagnetic coupling between the differential transmission path 101 and the coupler 200 and between the differential transmission path 101' and the coupler 200, or, the angle Φ. Thus, the two multiplexers 611 and 611' are used so that signals can be received from the coupler 200 even when the coupler 200 is coupled with any of the differential transmission paths 101 and 101'.

The negative differential signal is output from the multiplexer 611, and the positive differential signal is output from the multiplexer 611'. The negative differential signal and the positive differential signal are input to the shaping circuit 612 as differential signals. In the present exemplary embodiment, the input impedance of the shaping circuit 612 is set to be substantially equal to the characteristic impedance of the differential transmission paths 101 and 101'. Thus, the transmission characteristic from the coupler 200 to the differential transmission paths 101 and 101' is similar to that of the HPF that indicates a low degree of coupling in a low-frequency band, and a high degree of coupling in a high-frequency band. Thus, only a high-frequency component of a signal is transmitted from the coupler 200 to the differential transmission paths 101 and 101'. Specifically, inexact differential waveforms of signals input to the coupler 200 are generated on the differential transmission paths 101 and 101'. The shaping circuit 612 according to the present exemplary embodiment is a circuit for restoring the differential waveform to a binary digital signal with two values "1" or "0", such as a hysteresis comparator. The reception circuit (not illustrated) connected to the subsequent-stage of the shaping circuit 612 can convert the voltage level of a signal received from the shaping circuit 612 into a voltage level to meet desired interface specifications, and can output the converted voltage level. The reception circuit can have a re-clock function of reproducing a clock by CDR.

In the present exemplary embodiment, similarly in the above-described exemplary embodiments, common mode filters (common mode filters A and A' illustrated in FIG. 6) are provided on the differential transmission paths 101 and 101'. The common mode filters make it possible to reduce the effect of the difference in propagation delay (phase shift) caused by the difference in wiring length between the conductors 111 and 112 (or the conductors 111' and 112') on the communication. As for the positions of the common mode filters, the description in the above-described exemplary embodiments can be applied.

As described above, in the present exemplary embodiment, wireless communication can be performed from the communication apparatus 62 to the communication apparatus 61 while the communication apparatus 62 and the communication apparatus 62 rotate about the rotation axis 30. Similarly in the first exemplary embodiment, common mode filters are provided on the differential transmission paths 101 and 101' of the communication apparatus 61. This configuration provides similar advantageous effects to those described in the first exemplary embodiment. As described in the second exemplary embodiment, the wireless communication system can include the shorter differential transmission paths 101A, 101B, 101A', and 101B' in place of the differential transmission paths 101 and 101'.

Figure 7:
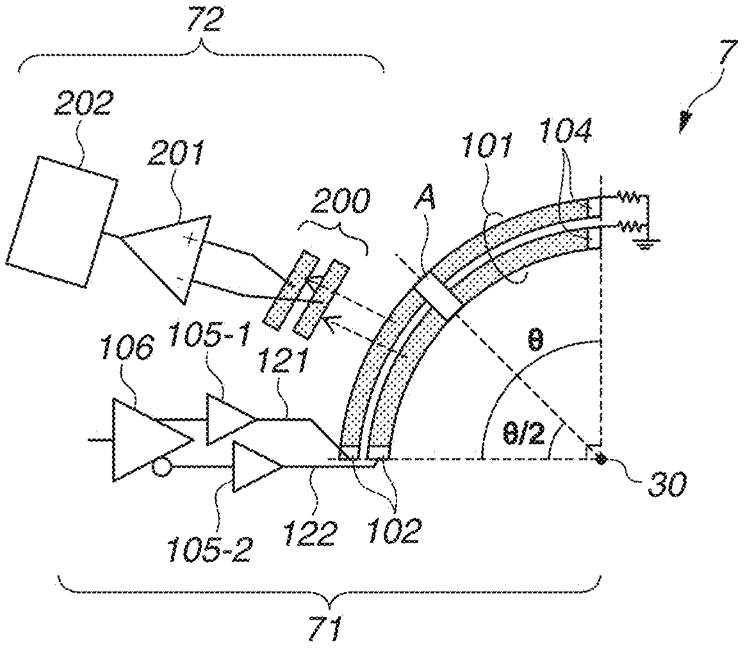
FIG. 7 illustrates a configuration example of a wireless communication system according to a fourth exemplary embodiment.

A fourth exemplary embodiment will now be described. FIG. 7 illustrates a configuration example of a wireless communication system 7 according to the fourth exemplary embodiment. The wireless communication system 7 includes a transmission-side communication apparatus 71 and a reception-side communication apparatus 72. The communication apparatus 71 includes the differential transmission path 101, the amplifier circuits 105-1 and 105-2, and the transmission circuit 106. The communication apparatus 72 includes the coupler 200, the shaping circuit 201, and the reception circuit 202. The wireless communication system 7 has a configuration in which the components of the differential transmission path 101' are eliminated from the configuration of the wireless communication system 1 described in the first exemplary embodiment in FIG. 1A. The differential transmission path 101 is disposed such that the angle θ formed between the power feeding portions 102 and the termination portions 104 is π/2 (=) 90°. Like reference numerals refer to like components identical to those of the wireless communication system 1 according to the first exemplary embodiment, and the descriptions thereof are omitted.

The wireless communication system 7 includes a rotation control unit (not illustrated) that controls the coupler 200 and the differential transmission path 101 to rotate in a reciprocating manner while the coupler 200 and the differential transmission path 101 are opposed to each other. The rotation angle in a reciprocating rotation is smaller than 360 degrees. In the example illustrated in FIG. 7, the rotation angle is 90 degrees. The common mode filter A is provided at a position of θ/2 (=) 45°. The communication apparatus 71 according to the present exemplary embodiment can be applied to a rotation portion, such as a tilt portion of a pan/tilt camera, which is assumed to rotate in a reciprocating manner (unlimited rotations are not required).

As described above, in the present exemplary embodiment, even when the rotation angle of the coupler 200 with respect to the differential transmission path 101 about the central axis 30 is smaller than 360 degrees, wireless communication can be performed from the communication apparatus 71 to the communication apparatus 72 while relatively rotating about the rotation axis 30. While the present exemplary embodiment illustrates an example where the rotation angle is smaller than 360 degrees, the rotation angle is not limited to this example. The rotation angle can be freely set by adjusting the transmission path length of the differential transmission path 101. Similarly in the first exemplary embodiment, the common mode filter is provided on the differential transmission path 101 in the communication apparatus 71. Consequently, this provides similar advantageous effects to those described in the first exemplary embodiment. As described in the third exemplary embodiment, the wireless communication system can be configured such that the transmission-side functions are replaced by the reception-side functions.

The disclosure of exemplary embodiments of the present disclosure includes the following configurations and method.

(Configuration 1)

A communication apparatus comprising:

a differential transmission path formed of a first electrode and a second electrode to perform wireless communication with another communication apparatus through an electromagnetic field coupling; and a communication unit configured to transmit a signal to the differential transmission path or receive a signal from the differential transmission path, wherein a first end of the differential transmission path is connected to the communication unit and a second end of the differential transmission path is terminated by a termination member, wherein the first electrode and the second electrode are each formed in a substantially arc shape about a predetermined axis, the substantially arc shapes of the first electrode and the second electrode being arranged as an outside and an inside, respectively, and wherein a filter portion configured to correct a difference in propagation delay caused by a difference in wiring length between the first electrode and the second electrode is provided on the differential transmission path.

(Configuration 2)

The communication apparatus according to configuration 1, wherein the filter portion is a common mode filter.

(Configuration 3)

The communication apparatus according to configuration 1, wherein the differential transmission path is provided on a dielectric substrate.

(Configuration 4)

The communication apparatus according to configuration 3, wherein the filter portion is provided on a surface of the dielectric substrate on which the differential transmission path is provided.

(Configuration 5)

The communication apparatus according to configuration 3, wherein the filter portion is provided on a surface of the dielectric substrate, the surface of the dielectric substrate being opposite to a surface on which the differential transmission path is provided.

(Configuration 6)

The communication apparatus according to configuration 1, wherein the filter portion is provided at a position where the difference in propagation delay from the first end is less than or equal to a unit interval of 0.5 on the differential transmission path.

(Configuration 7)

The communication apparatus according to configuration 1, wherein a plurality of the filter portions is provided on the differential transmission path.

(Configuration 8)

The communication apparatus according to Configuration 7, wherein the plurality of filter portions is provided substantially at regular intervals between the first end and the second end on the differential transmission path.

(Configuration 9)

A communication apparatus comprising:

a first differential transmission path formed of a first electrode and a second electrode to perform wireless communication with another communication apparatus through an electromagnetic field coupling;

a second differential transmission path formed of a third electrode and a fourth electrode to perform the wireless communication with the other communication apparatus;

a first communication unit configured to transmit a signal to the first differential transmission path or receive a signal from the first differential transmission path; and a second communication unit configured to transmit a signal to the second differential transmission path or receive a signal from the second differential transmission path, wherein the first differential transmission path and the second differential transmission path are adjacent to each other, wherein a first end of the first differential transmission path and a first end of the second differential transmission path are connected to the first communication unit and the second communication unit, respectively, wherein a second end of the first differential transmission path and a second end of the second differential transmission path are each terminated by a termination member, wherein the first electrode and the second electrode are each formed in a substantially arc shape about a predetermined axis, the substantially arc shapes of the first electrode and the second electrode being arranged as an outside and an inside, respectively, wherein the third electrode and the fourth electrode are each formed in a substantially arc shape about the predetermined axis, the substantially arc shapes of the third electrode and the fourth electrode being arranged as an outside and an inside, respectively, wherein a first filter portion configured to correct a difference in propagation delay caused by a difference in wiring length between the first electrode and the second electrode is provided on the first differential transmission path, and wherein a second filter portion configured to correct a difference in propagation delay caused by a difference in wiring length between the third electrode and the fourth electrode is provided on the second differential transmission path.

(Configuration 10)

A communication system comprising:

a first communication apparatus and a second communication apparatus, the first communication apparatus including a differential transmission path formed of a first electrode and a second electrode to perform wireless communication with the second communication apparatus through an electromagnetic field coupling; and a communication unit configured to transmit a signal to the differential transmission path or receive a signal from the differential transmission path, wherein a first end of the differential transmission path is connected to the communication unit, a second end of the differential transmission path is terminated by a termination member, wherein the first electrode and the second electrode are each formed in a substantially arc shape about a predetermined axis, the substantially arc shapes of the first electrode and the second electrode being arranged as an outside and an inside, respectively, and wherein a filter portion configured to correct a difference in propagation delay caused by a difference in wiring length between the first electrode and the second electrode is provided on the differential transmission path.

(Configuration 11)

The communication system according to configuration 10, further including a rotation control unit configured to cause at least one of the first communication apparatus and the second communication apparatus to rotate about the predetermined axis.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-164190, filed Sep. 27, 2023, which is hereby incorporated by reference herein in its entirety.

What is claimed is:

1. A communication apparatus comprising:

a differential transmission path formed of a first electrode and a second electrode, disposed on a first surface of a substrate, to perform wireless communication with another communication apparatus through an electromagnetic field coupling;

a transmission circuit connected to one end of the first electrode and one end of the second electrode and configured to transmit a signal to the differential transmission path;

a first resistor connected to an opposite end of the first electrode;

a second resistor connected to an opposite end of the second electrode; and a common mode filter connected to the differential transmission path and disposed on a second surface of the substrate, wherein the first electrode and the second electrode are each formed in a substantially arc shape about a predetermined axis, and an arc length of the first electrode and an arc length of the second electrode are different from each other.

2. The communication apparatus according to claim 1, wherein the common mode filter corrects a difference in propagation delay caused by a difference in wiring length between the first electrode and the second electrode.

3. The communication apparatus according to claim 1, wherein the common mode filter is provided at a position where a difference in propagation delay from a first end of the differential transmission path is less than or equal to a unit interval of 0.5 on the differential transmission path.

4. The communication apparatus according to claim 1, wherein a plurality of common mode filter portions are provided on the differential transmission path.

5. The communication apparatus according to claim 4, wherein the plurality of common mode filter portions are provided substantially at regular intervals between a first end and a second end on the differential transmission path.

6. The communication apparatus according to claim 1, further comprising:

another differential transmission path formed of a third electrode and a fourth electrode, disposed on the first surface of the substrate, to perform the wireless communication with the other communication apparatus;

a third resistor connected to an opposite end of the third electrode;

a fourth resistor connected to an opposite end of the fourth electrode; and another common mode filter connected to the other differential transmission path and disposed on the second surface of the substrate, wherein the third electrode and the fourth electrode are each formed in a substantially arc shape about the predetermined axis, and an arc length of the third electrode and an arc length of the fourth electrode are different from each other.

7. The communication apparatus according to claim 6, wherein the common mode filter corrects a difference in propagation delay caused by a difference in wiring length between the first electrode and the second electrode, and the other common mode filter corrects a difference in propagation delay caused by a difference in wiring length between the third electrode and the fourth electrode.

8. A communication system comprising:

a first communication apparatus and a second communication apparatus, the first communication apparatus including a differential transmission path formed of a first electrode and a second electrode, disposed on a first surface of a substrate, to perform wireless communication with the second communication apparatus through an electromagnetic field coupling; and a transmission circuit connected to one end of the first electrode and one end of the second electrode and configured to transmit a signal to the differential transmission path;

a first resistor connected to an opposite end of the first electrode;

a second resistor connected to an opposite end of the second electrode; and a common mode filter connected to the differential transmission path and disposed on a second surface of the substrate, wherein the first electrode and the second electrode are each formed in a substantially arc shape about a predetermined axis, and an arc length of the first electrode and an arc length of the second electrode are different from each other.

9. A communication apparatus comprising:

a differential transmission path including a first electrode and a second electrode to perform wireless communication with another communication apparatus through an electromagnetic field coupling;

a transmission circuit connected to one end of the first electrode and one end of the second electrode and configured to transmit a signal to the differential transmission path;

a first resistor connected to an opposite end of the first electrode;

a second resistor connected to an opposite end of the second electrode; and a common mode filter connected between the one end and the opposite end of the first electrode and between the one end and the opposite end of the second electrode, wherein the first electrode and the second electrode are each formed in a substantially arc shape about a predetermined axis, and an arc length of the first electrode and an arc length of the second electrode are different from each other.

10. The communication apparatus according to claim 9, wherein the common mode filter is provided at a position where a difference in propagation delay from a first end of the differential transmission path is less than or equal to a unit interval of 0.5 on the differential transmission path.

11. The communication apparatus according to claim 9, wherein the first electrode and the second electrode are disposed on a first surface of a substrate, and wherein the common mode filter is disposed on a second surface of the substrate.

* * * * *